(No Model.)
J. C. FIESTER.
MEANS FOR FASTENING WHEELS TO SHAFTS.
No. 525,009. Patented Aug. 28, 1894.
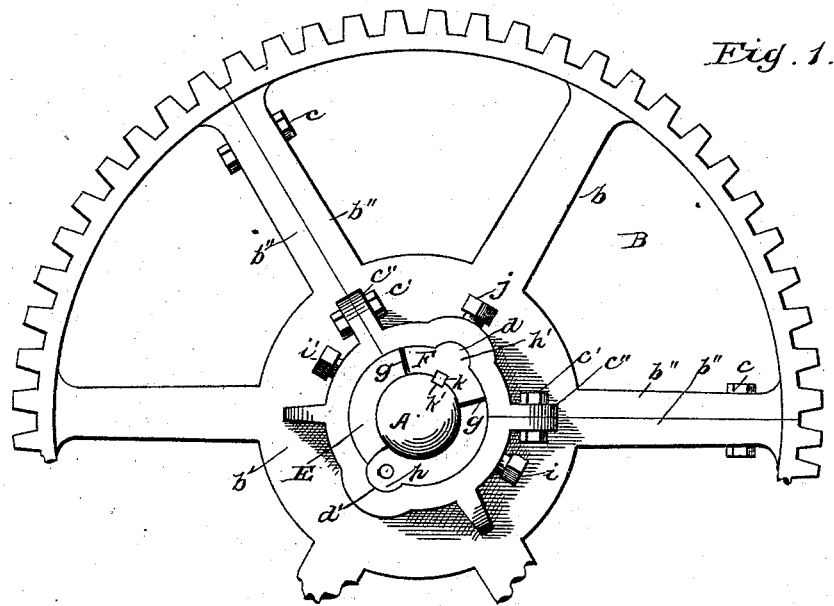
Fig. 1.
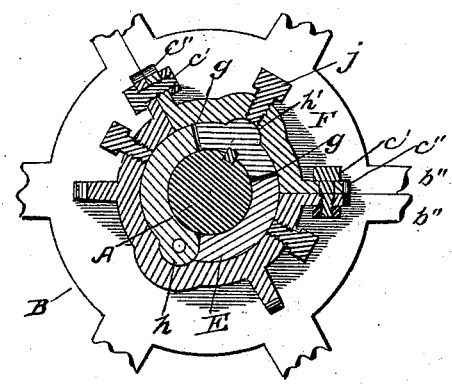
Fig. 2.
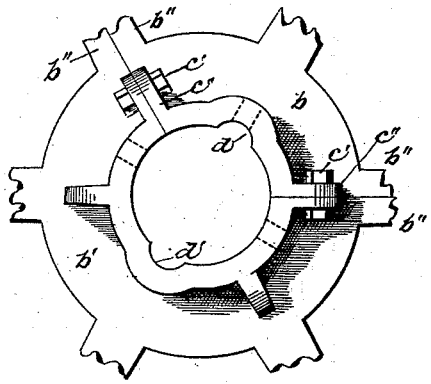
Fig. 3.
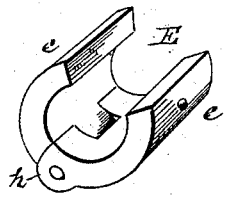
Fig. 4.
Fig. 5.
Witnesses:
W. H. H. Knight
H. H. Benhard
Inventor.
John C. Fiester
By Edson Bros.
Attorneys.

UNITED STATES PATENT OFFICE.

JOHN C. FIESTER, OF READING, PENNSYLVANIA.

MEANS FOR FASTENING WHEELS TO SHAFTS.

SPECIFICATION forming part of Letters Patent No. 525,009, dated August 28, 1894.

Application filed January 17, 1894. Serial No. 497,195. (No model.)

*To all whom it may concern:*

Be it known that I, JOHN C. FIESTER, a citizen of the United States, residing at Reading, in the county of Berks and State of Pennsylvania, have invented certain new and useful Improvements in Means for Fastening Wheels to Shafts; and I do hereby declare the following to be a full, clear, and exact description of the invention, such as will enable others skilled in the art to which it appertains to make and use the same.

The common practice of securing gear wheels, pulleys, and other objects to shafts has been either to key the object to the shaft or to clamp it thereto by means of binding screws which are tapped into the hub of the wheel and engage with the shaft. In the former method, *i. e.* by keying the wheel on the shaft, it is very difficult to remove the wheel when it is broken or otherwise damaged to such an extent as to necessitate its removal, and it is not infrequently the case that the machine must be taken apart or the wheel must be broken around its hub in order to displace it from the shaft. If a wheel is fixed to the shaft by means of the clamping screws, the shaft is worn by the contact of the screws thereon. I have found that the shaft will become bruised to such an extent as to cut a groove or channel clear around its circumference, and as the screws must be continually tightened, the groove or channel will progressively cut deeper into the shaft, thereby weakening it and finally causing it to become broken.

The object of the present improvement is to overcome these difficulties and objections by the provision of a fastening device which can be easily adjusted to securely hold the hub of the wheel on the shaft and which will protect the shaft from being bruised by tight frictional contact of the clamping devices therewith.

To the accomplishment of these ends, the first part of my invention consists in the combination with a shaft, and the hub of a wheel, of a divided sleeve keyed to the hub and interposed between the latter and the shaft, a key fitted between the divided ends of the sleeve and interlocked with the hub of the wheel, and clamping screws fitted in the hub and operating against the sleeve and the key to clamp the sleeve and key tightly upon the shaft and prevent the hub from turning on the concentric key and sleeve.

My invention further consists in the combination with a shaft, of a wheel having its rim, spokes and hub divided or made into sections which are adapted to be fastened together by suitable means and to be separable from one another, a divided sleeve and key substantially continuous with each other and independently interlocked with the shaft and hub, and the clamping screws which force the sleeve and key tightly upon the shaft. And the invention further consists in the peculiar construction and arrangement of parts, and in the novel combinations of devices which will be hereinafter more fully described and pointed out in the claims.

I have illustrated the preferred embodiment of my invention in the accompanying drawings, forming a part of this specification, in which—

Figure 1 is a side elevation. Fig. 2 is a vertical sectional view through the hub, shaft, and the fastening means at right angles to the axis of the shaft. Fig. 3 is a detail view of the hub to show the grooves or seats therein. Fig. 4 is a detail view of the divided sleeve, and Fig. 5 is a view of the key adapted to form a continuation of the sleeve.

Like letters of reference denote corresponding parts in all the figures of the drawings, referring to which—

A designates the shaft, and B the wheel which is to be secured thereon. This wheel may be a gear wheel as indicated in Fig. 1 of the drawings, or it may be a pulley; but I do not restrict myself to the form of the wheel as my invention is applicable to different kinds of wheels which it is desired to firmly secure to shafts without bruising the latter. The wheel may be made solid or cast in a single piece of metal, with its hub constructed to receive the fastening appliances, but I prefer to divide the wheel into sections as shown by Fig. 1, in which, *b*, indicates one of the sections and *b'* the other section. The wheel can be divided through its center, or halved, or it can be divided to make one section form a third of its circumference and the other section the remaining two-thirds of its circumference, or it can be divided on any other lines as may be preferred. By sections of the wheel I mean that each part consists of a portion of the rim, hub, and a series of spokes all joined together or made integral, and the sections of the wheel are united together by means of bolts $c$ which pass through the lapped arms $b''$ and the bolts $c'$ which pass through the lugs, $c''$, integral with the hub-sections, as shown. This hub of the wheel is constructed with the grooves or channels, $d$, $d'$, which extend in the direction of the axis of the wheel and which are situated at diametrically opposite points on the inside of the hub; and in these channels or grooves of the hub are fitted the tongues on the divided sleeve and the key, whereby the hub and wheel are prevented from turning on the concentric sleeve and key,—these parts being interlocked thereby—as will be more fully described.

E indicates the divided metallic sleeve, and F the metallic key which are substantially continuous with each other and which are interposed between the shaft and the hub of the wheel. This sleeve E is constructed to span the shaft for nearly its circumference, say about two thirds of the way around said shaft, and the key is fitted between the ends of the sleeve and designed to span the remaining portion of the shaft, the key fitting snugly to or between the ends of the sleeve. This sleeve is constructed of two sections, $e$, $e'$, of segmental form to fit closely upon the cylindrical surface of the shaft, and the key is likewise segmental in form, but the meeting ends of the sleeve and the key are beveled or inclined to form the joints, $g$, see Figs. 1 and 2. The sections of the sleeve are articulated or jointed together, as at $e''$, and in order to make the inner surface of the sleeve continuous so as to fit the shaft perfectly, I articulate the members so as to provide a tongue, $h$, on the outside perimeter of the sleeve, which tongue fits snugly in one of the grooves or channels, $d'$ in the hub. The key F is likewise provided on its outer surface with a tongue, $h'$, which is fitted in the other groove or channel $d'$ within the hub, whereby the continuous key and sleeve are interlocked with the hub in a manner to prevent the hub from turning on said sleeve and the key. The interlocking tongue and groove joints between the sleeve, the key and hub are disposed in a line substantially at right angles to the lines of division of the wheel, B, so that they break joints and present a substantial durable construction. The sleeve is forced inward upon and clamped to the shaft A by means of the set screws, $i$, $i'$, which are fitted in tapped openings in the hub and which bear or press against the outer surface of the sleeve; and the key F is likewise clamped upon the shaft by other screws, $j$, which find similar bearings in tapped holes in the hub and bear upon the outer surface of the key.

In case the wheel is subjected to very great strain, I provide the key with a spline, $k$, which fits in a groove or seat $k'$ formed in the periphery of the shaft, so as to more perfectly unite the key to the shaft; but when the wheel is not subjected to excessive strains, this spline and groove are dispensed with and the binding screws are relied upon to compress the sleeve and key tightly upon the shaft in order to fasten the wheel thereto.

The method of adjusting a wheel to a shaft is as follows: If the wheel is solid or in one piece, the hub is slipped over the shaft to the proper position, the divided sleeve E fitted between the shaft and hub and with its tongue in the groove or channel, $d$, and then the key is slipped in between the ends of the sleeve so as to be practically continuous therewith and thus interposed between the shaft and the hub, the tongue $h'$ on the key occupying the groove or channel, $d'$, in the hub. The screws $j$ are first tightened upon the key F, and the screws, $i$, are subsequently tightened on opposite sides of the sleeve, whereby the sleeve and key are caused to hug the shaft with a tight frictional clasp and the wheel is securely clamped to the shaft along with the sleeve and the key. To detach the wheel, the screws are all released, the key slipped endwise out of position to release the hub from the shaft, and the wheel can now be readily taken off, that is to say, if the wheel is solid, it can be slipped off the shaft or if it is a divided wheel, the sections $b$, $b'$ thereof can be separated to easily take the wheel off the shaft. If desired, the hub of the wheel can be divided transversely to the axis of the same, thus splitting the hub into sections which are adapted to press or bear endwise against each other.

I am aware that changes in the form and proportion of parts, and in the details of construction, of the devices herein shown and described as an embodiment of my invention can be made without departing from the spirit or sacrificing the advantages thereof, and I therefore reserve the right to make such modifications and alterations as fairly fall within the scope of my invention.

Having thus fully described my invention, what I claim as new, and desire to secure by Letters Patent, is—

1. The combination with a shaft and a wheel-hub of an articulated sleeve between the shaft and wheel-hub and interlocked with the latter, a key also interlocked with the wheel-hub, and means for clamping the sleeve and key upon the shaft, substantially as and for the purposes described.

2. The combination with a shaft, of a wheel hub, a divided sectional sleeve having its members articulated together and interlocked with the wheel-hub, a key fitted between the ends of said sleeve and also interlocked with the wheel-hub, and clamping devices carried by the wheel-hub and bearing upon the sleeve and hub, substantially as and for the purposes described.

3. The combination with a shaft, and a wheel-hub, of the concentric sleeve and key interposed between the hub and shaft and independently interlocked with the hub and clamped upon the shaft, substantially as and for the purposes described.

4. The combination with a shaft, of a wheel-hub having the grooves or channels within the same, a sectional sleeve having its members pivoted together and forming a tongue which fits in one of the grooves or channels of the hub, a key concentric with the sleeve between the ends of which it is fitted and provided with a tongue occupying the other groove or channel of the hub, and the clamping screws fitted in said hub and bearing upon the sleeve and key, substantially as and for the purposes described.

5. The combination with a shaft, of a divided hub and wheel having the members detachably clamped together, a divided articulated sleeve partially encompassing said shaft and interlocked with one section of the hub, a key fitted between the ends of the sleeve and interlocked with the other section of said hub independently of the sleeve, and clamping devices carried by the hub and bearing upon the sleeve and key, substantially as and for the purposes described.

6. The combination with a shaft, of a divided wheel-hub and wheel having the members separably clamped together, the concentric sleeve and key interposed between the hub and shaft and independently interlocked with the hub on lines which break joints with the lines of division of the hub and wheel, and the clamping devices carried by the hub and bearing upon the sleeve and key, substantially as and for the purposes described.

JOHN C. FIESTER. [L. S.]

In presence of—
J. P. KREMP,
L. X. BRISSE.